United States Patent [19]

Greskovich et al.

[11] 4,279,656

[45] Jul. 21, 1981

[54] LIGHT-TRANSMITTING SILICON NITRIDE

[75] Inventors: Charles D. Greskovich, Schenectady; Svante Prochazka, Ballston Lake; John A. Palm, Clifton Park, all of N.Y.

[73] Assignee: General Electric Company, Schenectady, N.Y.

[21] Appl. No.: 114,632

[22] Filed: Jan. 23, 1980

[51] Int. Cl.$^3$ .............................................. C04B 35/58
[52] U.S. Cl. .................................................... 106/73.5
[58] Field of Search ........................................ 106/73.5

[56] References Cited

U.S. PATENT DOCUMENTS 4,124,403  11/1978  Greskovich et al. ............... 106/73.5

Primary Examiner—O. R. Vertiz
Assistant Examiner—Mark Bell
Attorney, Agent, or Firm—Jane M. Binkowski; James C. Davis, Jr.; Leo I. MaLossi

[57] ABSTRACT

A polycrystalline silicon nitride body having a density of at least 99.5% of the theoretical density of silicon nitride, a thickness ranging from about 0.15 mm up to but less than 0.4 mm, a minimum in-line transmission of about 5% of radiant energy at wavelengths ranging from about 0.9 micron to about 2.5 microns, and a minimum in-line transmission of about 10% at wavelengths ranging from about 2.5 microns to about 4.5 microns.

3 Claims, 4 Drawing Figures

LIGHT-TRANSMITTING SILICON NITRIDE

This invention relates to a light-transmitting polycrystalline silicon nitride ceramic body.

Chemical vapor deposited (CVD) $Si_3N_4$ is the only dense form which is reported to exhibit transparency or translucency. No optical data on hot pressed or sintered $Si_3N_4$ is known in the visible-to-infrared regions of the electromagnetic spectrum.

Some of the major problems with the CVD method as well as the resulting CVD $Si_3N_4$ are: (1) the deposition rate is usually low and therefore time consuming; (2) it is difficult to make this optical material in bulk form or with large surface areas reproducibly; and (3) the deposited silicon nitride is textured and is susceptible to cracking because of its oriented grain structure which lowers its mechanical strength. The CVD method produces only α-silicon nitride which contains no additives.

In contrast, the present light-transmitting polycrystalline silicon nitride product is prepared from a hot-pressed body formed by hot-pressing silicon nitride powder containing a beryllium additive. The grains of the hot-pressed body are essentially randomly oriented providing the resulting light-transmitting product with a mechanical strength significantly greater than that which can be achieved by the CVD method.

Briefly stated, the process of producing the hot-pressed body used to prepare the present light-transmitting product comprises providing a significantly homogeneous powder dispersion having an average particle size which is submicron of silicon nitride and a beryllium additive, said silicon nitride powder containing metallic impurities up to about 0.1% by weight of said silicon nitride powder, said dispersion containing oxygen in an amount ranging from about 2.5% by weight to about 5% by weight of said silicon nitride powder, said beryllium additive being selected from the group consisting of beryllium, beryllia, beryllium nitride, beryllium fluoride, beryllium silicon nitride and mixtures thereof, said beryllium additives being used in an amount wherein the beryllium component is equivalent to from about 0.3% by weight to about 2% by weight of elemental beryllium based on the amount of silicon nitride, and hot-pressing said dispersion in an atmosphere of nitrogen at a temperature ranging from about 1700° C. to about 1800° C. under a pressure of at least about 3500 psi producing a hot-pressed polycrystalline silicon nitride body having a density of at least 99.5% of the theoretical density of silicon nitride.

The silicon nitride powder used in the present process may be amorphous or of the α-type or mixtures thereof. These powders can also contain β-silicon nitride usually in an amount up to about 20 weight % of the total amount of silicon nitride.

At present commercially available silicon nitride powder in any significant amount is formed by nitridation of silicon powder with the aid of catalysts which always leave calcium, iron and aluminum in some form as impurities in a significant amount, typically about 1 to 2%. Such a powder is not useful in the present process because when it is hot-pressed, these impurities combine with $SiO_2$, which is inherently initially present in silicon nitride to produce a low melting intergranular glassy phase which scatters light. In addition, the high iron levels of these powders also cause light absorption in the visible region of the electromagnetic spectrum.

In contrast, the present starting silicon nitride powder is substantially pure but it can range somewhat in purity depending largely on the particular light-transmitting properties desired.

The present silicon nitride powder may contain certain metallic and non-metallic impurities in a limited amount and these impurities are based on the total composition, i.e. total weight of the starting silicon nitride power. Specifically, the powder should be free or substantially free of metallic impurities which react with $SiO_2$ or Si and $O_2$ to form low melting intergranular silicate glassy phase in a significant amount. Those impurities which form such a glassy phase include calcium, iron, magnesium and should not be present in a total amount greater than up to about 0.1% by weight. Also, the present silicon nitride powder may have an oxygen content ranging up to about 5% by weight. Normally, the oxygen is present in the form of silica. Any excess elemental silicon in the powder preferably is present in an amount no higher than about 4% by weight. Elemental silicon has little effect on the infrared transmission since it does not absorb such radiation, but in the visible region the amount of elemental silicon should be minimized and possibly eliminated because elemental silicon particles are strong absorption centers. Also, any elemental silicon present should be of submicron size and substantially homogeneously dispersed throughout the powder in order to minimize light scattering effects in the product. Nonoxide impurities such as halogens evaporate to a significant extent on heat treatment and do not appear to significantly deteriorate the properties of the hot-pressed silicon nitride body, and therefore the resulting light-transmitting product, when present in amounts up to about 1% by weight of the starting silicon nitride powder.

The present silicon nitride powder can be produced by a number of processes. For example, in one process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination yielding silicon nitride which usually contains oxygen and halogens at the desired weight level. The powder can also be synthesized in a plasma from silicon vapor and nitrogen.

Very pure silicon nitride powder can be formed by a process set forth in U.S. Pat. No. 4,122,155, which by reference is incorporated herein, and which discloses reacting silane and an excess amount of ammonia above 500° C. and calcining the resulting solid at between 1100° C. to 1500° C. to obtain amorphous or crystalline silicon nitride.

In the present process the beryllium additive is selected from the group consisting of elemental beryllium, beryllia, beryllium nitride, beryllium fluoride, beryllium silicon nitride and mixtures thereof. The known stoichiometric formulations for these additives are Be, BeO, $Be_3N_2$, $BeF_2$ and $BeSiN_2$, $Be_6Si_3N_8$, $Be_4SiN_4$, $Be_5Si_2N_6$, $Be_{11}Si_5N_{14}$, $Be_9Si_3N_{10}$. In the present process the beryllium additive is used in an amount so that its beryllium component is equivalent to from about 0.3% to about 2.0% by weight of elemental beryllium, and preferably from about 0.5% to about 1.0% by weight of elemental beryllium, based on the amount of silicon nitride. Amounts of the beryllium additive outside the range are not effective in producing the present hot-pressed body with a density of at least about 99.5%.

In carrying out the present process at least significantly or substantially uniform or homogeneous particulate dispersion, or mixture having an average particle size which is submicron of silicon nitride and beryllium additive is formed. Such a dispersion is necessary to produce the present product with significantly uniform light-transmitting properties and having a density of at least 99.5%. The silicon nitride and beryllium additive powders, themselves, may be of a particle size which breaks down to the desired size in forming the dispersion but preferably the starting silicon nitride is submicron and the starting beryllium additive is less than 5 microns in particle size, and preferably submicron. Generally, the silicon nitride powder ranges in mean surface area from about 2 square meters per gram to about 50 square meters per gram which is equivalent to about 0.94 micron to 0.04 micron, respectively, and preferably, the silicon nitride powder ranges in mean surface area from about 5 square meters per gram to about 25 square meters per gram which is equivalent to about 0.38 micron to about 0.08 micron, respectively.

The silicon nitride and beryllium additive powders can be admixed by a number of techniques such as, for example, ball milling or vibratory milling, to produce a homogeneous dispersion. The more uniform the dispersion, the more uniform is the microstructure and properties of the resulting dense hot-pressed body.

Representative of these mixing techniques is ball milling, preferably with balls of a material such as tungsten carbide, steel or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing mediums include hydrocarbons such as heptane, hexane, and benzene. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven or a ventilated hood.

If grinding media such as steel balls are used which may leave metallic contaminants, the milled powder can be leached with an acid such as HCl to remove metallic contaminants. The leached powder can be washed repeatedly with water to decrease the iron content, and final sedimentation can be achieved by further washing with an agent such as acetone.

In the present invention, the powder dispersion being hot pressed should contain oxygen in an amount ranging from about 2.5% by weight up to about 5% by weight of the silicon nitride. Such oxygen content initially may be present in the silicon nitride powder, or it may be introduced into the powder, or into the homogeneous particulate dispersion of silicon nitride and beryllium additive. To elevate the oxygen content to the desired amount, it is preferable to oxidize the homogeneous dispersion. Oxidation to a prescribed amount can be carried out, for example, by heating the weighed powder in a temperature ranging from about 900° to about 1100° C. in an atmosphere of oxygen or air and monitoring increase in oxygen content by weight gain measurements. Alternatively, oxygen content of the treated powder can be determined by neutron activation analysis. If desired, oxygen content can also be elevated by the addition of colloidal silica, preferably in the mixing step. With an oxygen content above about 5%, sufficient secondary phase forms in the product to significantly promote light scattering and reduce light transmittance.

The present powder dispersion is hot-pressed in an atmosphere of nitrogen. The nitrogen inhibits or prevents significant thermal decomposition of the silicon nitride and thereby promotes its densification. In the present invention no significant weight loss due to the thermal decomposition of silicon nitride occurs. By a significant thermal decomposition of the silicon nitride herein it is meant a decomposition which produces elemental silicon in the hot-pressed body in an amount no higher than about 4% by volume of the body.

In carrying out the present process, the particulate mixture or dispersion is hot-pressed, i.e. densified, at a pressure and temperature and for a sufficient period of time to produce the present dense product. Preferably, the surface of the graphite die and plungers exposed to the silicon nitride powder are coated with a thin layer of an inert agent such as boron nitride to prevent chemical reaction during hot pressing. Specifically, the hot-pressing temperature ranges from about 1700° C. to about 1800° C. and applied pressure at such pressing temperature ranges from about 3500 psi to a maximum pressure which is limited by available pressing equipment. Thus, for solid graphite dies the upper limit is about 5000 psi and for graphite fiber-wound dies the upper limit is about 15,000 psi. The specific temperature and pressure used is determined empirically and depends largely on the powder being pressed and the specific dense product desired. The higher the pressure, the lower is the pressing temperature required, but as a practical matter, temperatures below about 1700° C. will not produce the present dense product. On the other hand, temperatures higher than about 1800° C. are not practical since the silicon nitride decomposes and also reacts with the graphite die. It is advantageous to use a pressure close to the maximum available because the application of such high pressure improves density, and therefore, light-transmitting quality. Generally, hot-pressing in the present process is carried out at the desired temperature in a period of time ranging up to about 60 minutes, and longer periods of time usually do not provide any significant advantage. During hot pressing, amorphous and/or $\alpha$-silicon nitride transform to the $\beta$-form of silicon nitride.

The hot-pressed body can be reduced to the thickness of the present light-transmitting product by chemical or mechanical means, and preferably, by mechanical means such as grinding and/or polishing. Polishing is preferably carried out with a diamond paste. To produce the present product, the hot pressed body should be polished on both sides, i.e. opposing faces. Both faces should be polished so that they are at least substantially smooth, i.e. there should be insufficient rough or textured surface area remaining on each face which would significantly inhibit light transmission. Also, to maximize light transmission, both faces of the present product should be at least substantially parallel with each other. Generally, the present light-transmitting product is in the form of a plate which can have any geometric shape such as a disc, rectangle or square. The surface area of the present light-transmitting product is limited only by the size of the press used in the hot pressing step.

The present light-transmitting polycrystalline silicon nitride product has a density of at least 99.5% of the theoretical density of silicon nitride and consists essentially of silicon nitride, beryllium and oxygen, said silicon nitride ranging from the $\beta$-form to a mixture of the $\alpha$- and $\beta$-forms wherein the $\beta$-form is present in major amount, said beryllium being present in an amount ranging from about 0.3% by weight to about 2.0% by weight of said product, said oxygen being present in an amount ranging from about 2.5% up to about 5% by weight of said product, said polycrystalline product ranging from a single phase product to one comprised of a primary phase and up to about 3% by volume of said product of a secondary phase, said product having a thickness ranging from about 0.15 millimeter up to but less than about 0.4 millimeter, a minimum in-line transmission of about 5% of radiant energy at wavelengths ranging from about 0.9 micron to about 2.5 microns, and a minimum in-line transmission of about 10% at wavelengths ranging from about 2.5 microns to about 4.5 microns.

The hot-pressed body, and the present light-transmitting product prepared therefrom, may be single phase or it may contain a minor amount of secondary phase. By the term single phase or primary phase it is meant herein the silicon nitride phase, i.e. the $\alpha$-form or $\beta$-form of silicon nitride and mixtures thereof. The total volume of secondary phase in the present product ranges up to about 3% by volume of the product and such secondary phase or phases may be $BeSiN_2$, elemental silicon, $Si_2N_2O$, and glassy phase. The secondary phase or phases are discrete and distributed substantially uniformly throughout the present product. Generally, the grains of the secondary phase or phases are of about the same size or finer than the grains of the primary phase. For maximum light transmission, the present product is preferably single phase. Secondary phase or phases in excess of about 3% by volume of the product scatter light sufficiently to prevent the product from having the present light transmitting properties.

The phase composition of the silicon nitride in the hot-pressed body, and the present light-transmitting product prepared therefrom, ranges from a mixture of $\alpha$- and $\beta$-silicon nitride with the $\beta$-silicon nitride always being present in major amount, i.e. in excess of 50% by weight of the total weight of silicon nitride, to $\beta$-silicon nitride alone, as evidenced by X-ray diffraction analysis. The $\beta$-grains and the $\alpha$-grains are generally less than about 5 microns in size and typically range between 0.5 and 1.5 microns. At relatively high hot-pressing temperatures and for relatively long periods of hot-pressing, the $\beta$-grains may grow to a length of about 10 microns. Since there is no significant weight loss during hot pressing, the composition of the present product is not significantly different from that of the starting particulate dispersion.

The present light-transmitting product has a density of at least 99.5% of the theoretical density of silicon nitride. Since light-transmission improves with increasing density, the present product with densities higher than 99.5% are preferred. The average pore size of the present product is less than 1 micron, with generally no pores being larger in size than 5 microns.

The present product is comprised of silicon nitride and some form of beryllium and oxygen. The beryllium is present in an amount ranging from about 0.3% by weight to about 2.0% by weight of the silicon nitride. The beryllium content of the product is detectable or determinable by techniques such as atomic absorption spectroscopy and chemical analysis. Oxygen content may be determined by techniques such as neutron activation analysis.

The present light-transmitting polycrystalline silicon nitride product or body has a thickness ranging from about 0.15 mm up to but less than about 0.4 mm, a minimum in-line transmission of about 5% at wavelengths ranging from about 0.9 micron to about 2.5 microns, and a minimum in-line transmission of about 10% at wavelengths ranging from about 2.5 microns to about 4.5 microns. A product with a thickness less than about 0.15 mm usually has insufficient mechanical strength for handling whereas one of 0.4 mm thickness and higher is non-light transmitting. For best results, the present product has a thickness of about 0.2 mm.

The extent of light transmittance or in-line transmission of the present product depends largely on its thickness and wavelengths. The thinner the product, the better its light transmission. Specifically, at a thickness of about 0.2 mm and less, the present product exhibits visible transmission, i.e. it is optically translucent.

In the present invention, correction for surface reflection losses from the present product is omitted, since the in-line transmission measurement is all that needs to be considered for present purposes.

Those skilled in the art will gain a further and better understanding of the present invention from the detailed description set forth below, considered in conjunction with the figures accompanying and forming a part of the specification, in which.

Figure 1:
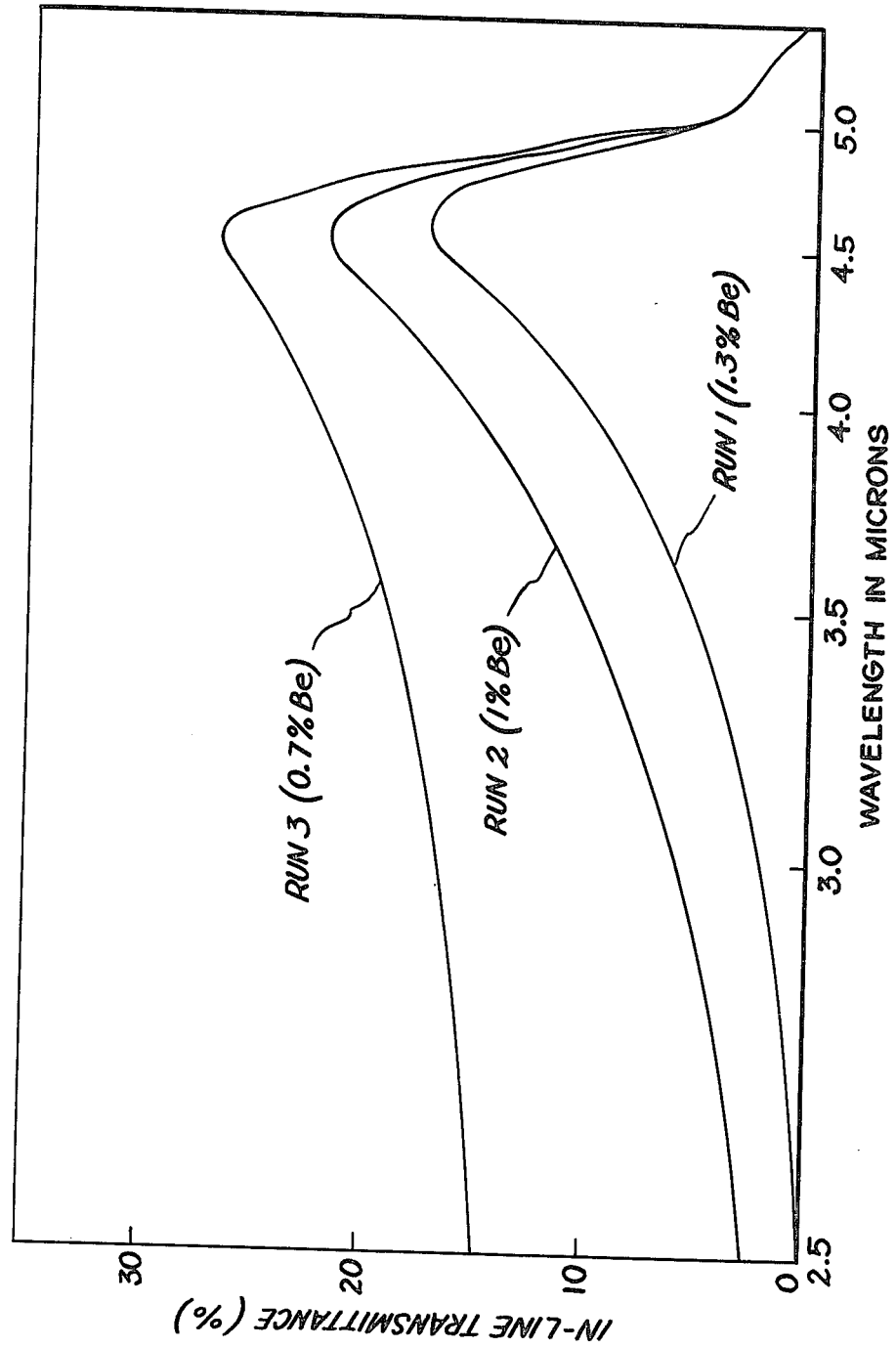
FIG. 1 shows in-line transmission as a function of the wavelength of light in the infrared region, and specifically, the three graphs of FIG. 1 shows the effect of varying amounts of densification agent on in-line transmission.

Since the present product transmits various degrees of light at various wavelengths of light, it is useful in any system where a hard protective material or plate having the present light-transmitting properties is needed. Specifically, it is useful as a light-transmitting filter or light-transmitting window for a solar cell that might be exposed to radiation. It is especially useful as a shield for a sensor that prevents the transmission of light waves which would destroy the sensor but transmits light of wavelengths to which the sensor is sensitized.

In the present invention, unless otherwise stated, the density of the hot-pressed body is given in % as a fractional density of the theoretical density of silicon nitride (3.18 g/cc).

The invention is further illustrated by the following Runs wherein the procedure was as follows unless otherwise stated:

For Runs 1 to 10, the silicon nitride powder contained a large amount (20 to 40% by weight) of amorphous $Si_2N_4$, and of the remaining portion that is crystalline, about 92% by weight was α- and 8% by weight was β-Si₃N₄.

For Runs 1, 2, 3 and 10, the silicon nitride powder was initially ball milled to increase its surface area. The milled powder was leached with a 20% solution of HCl to remove Fe contamination, washed repeatedly with deionized water, then washed with acetone and dried. The resulting silicon nitride powder had a specific surface area of 13.3 m²/g, and based on the weight of silicon nitride, contained 3.2% by weight of oxygen, less than 0.05% by weight of metallic impurities (450 ppm Fe, <10 ppm Ca, <10 ppm Al), less than 0.07% by weight of chlorine, and a trace amount of elemental silicon. This silicon nitride powder was then ball milled with the given amount of BeSiN₂ in Table I in a polyethylene jar using silicon nitride grinding media in heptane at room temperature. After one hour of milling, the resulting mixture was air dried, producing a powder dispersion having an average particle size which was submicron.

For Runs 4-9, 7% by weight of BeSiN₂ was added to a silicon nitride powder and the mixture was ball milled in a steel mill with steel balls and benzene for 72 hours at room temperature. After benzene removal by evaporation, the milled powder mixture was acid leached in a 20% solution of HCl to remove metallic contamination. The resulting mixture was repeatedly washed with deionized H₂O until Fe²⁺ free. Final sedimentation was achieved by acetone washing. The powder was dried in an air oven at 80° C. for 12 hours. The resulting homogeneous dispersion had an average particle size which was submicron, and based on the weight of silicon nitride contained less than 0.5% by weight of metallic impurities, less than 0.08% by weight of chlorine, and a trace amount of silicon. This dispersion, in 5 gram amounts, was oxidized in air at 1000° C. for the time periods given in Table I resulting in the given oxygen content.

A graphite fiber wound die with an inner diameter of 1 centimeter and plunger system was used for hot pressing. A thin coating of boron nitride was coated on the surfaces exposed to the silicon nitride powder.

Approximately a 0.5 gram sample was hot pressed in each run.

For Runs 1-3, the temperature-pressure cycle was comprised of (1) evacuating to less than 1 torr and filling with N₂ gas; repeat, (2) applying a pressure of ~500 psi at room temperature and a final pressure of 10,000 psi at 1100°-1200° C. The time to reach 1780° C. was 15 to 20 minutes. After a soak time of 15 minutes at 1780° C. in nitrogen, the power to the induction coils was turned-off and the applied pressure of 10,000 psi was reduced during cooling. For Runs 4-10 the cycle was the same as in Runs 1-3 except that the final pressure was 12,000 psi.

Each hot pressed body was in the form of a disc ranging in thickness from about 1.5 mm to about 1.8 mm and the boron nitride coating on each disc was removed before grinding and polishing.

Each hot pressed body was polycrystalline wherein the silicon nitride content was a mixture of the α- and β- forms with the β-form being present in an amount greater than 80% by weight of the total amount of silicon nitride. Also, each hot-pressed body was comprised of a primary phase with a total volume of secondary phases being present in less than 3% by volume of the total volume of the body. The oxygen content of each hot pressed body, and therefore the light-transmitting disc prepared therefrom, ranged from about 2.5% up to about 5% by weight of said body.

Oxygen content was determined by weight measurements and by neutron activation analysis.

Density of the hot-pressed body was determined before its thickness was reduced and is given in Table I. Density was determined by water displacement using Archimedes method which was capable of measuring densities reproducibly up to about 99.8% of theoretical value.

Each disc was ground on a 320 grit diamond wheel and then polished with a diamond paste on each face so that both faces of each disc were substantially smooth, flat and parallel to each other. None of the finally polished discs exhibited any cracking. The thickness of each of the finally polished discs is given in Table I. Each finally polished disc, i.e. the disc of the present invention, had a diameter of about 1 centimeter.

Two spectrometers were used to measure in-line transmittance. Cary Model 14 Spectrometer was used for measuring in-line transmission in the visible region, i.e. the wavelength ranging from about 0.3 micron to about 0.7 micron. Nicolet 7199 Fourier Transform Infrared Spectrometer was used to measure in-line transmission in the near infrared region ranging from about 0.7 micron to about 2.5 microns and the infrared region ranging from about 2.5 microns to 25 microns.

Correction for surface reflection losses is omitted, since the in-line transmission measurement is all that needs to be considered for present purposes.

Figure 2:
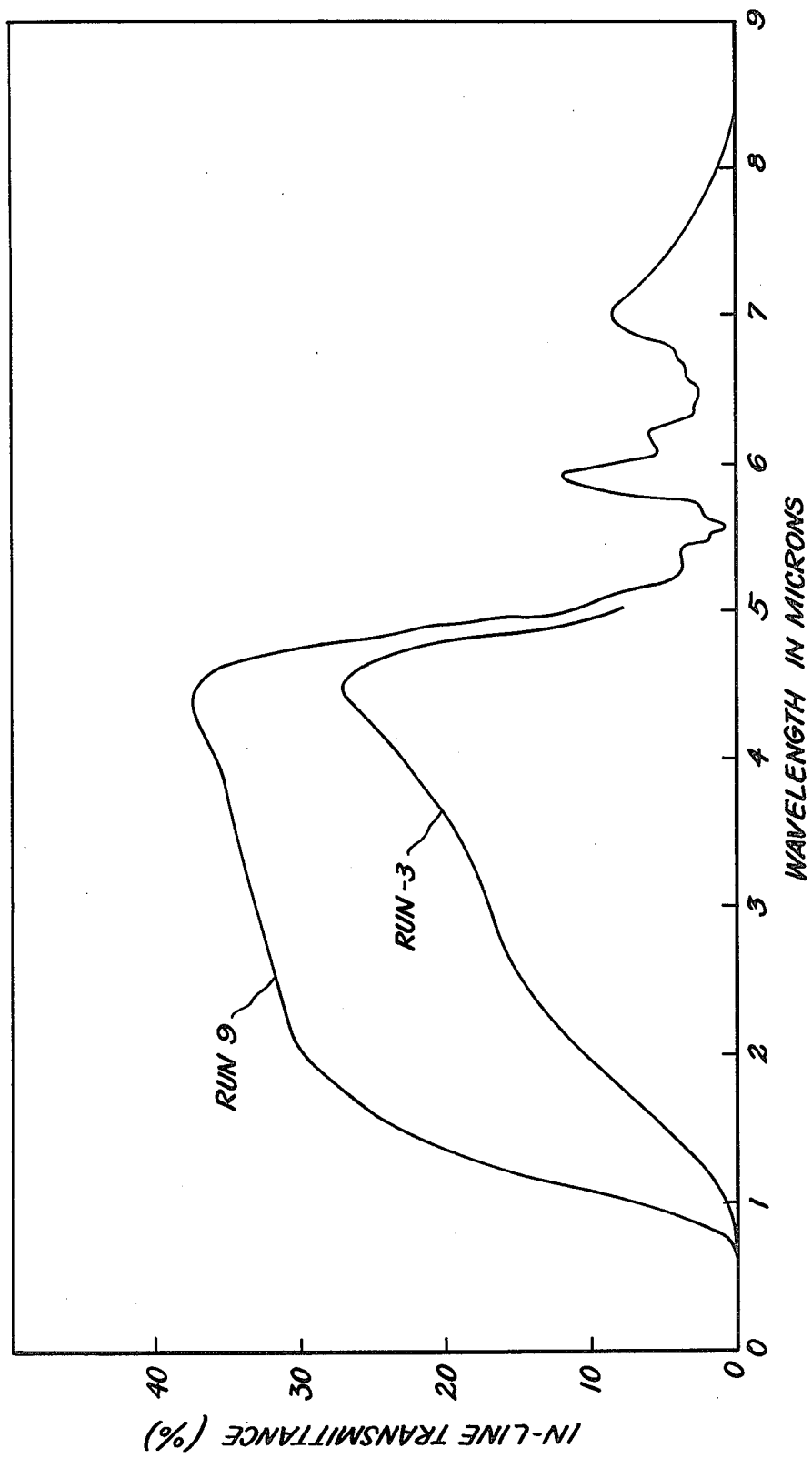
FIG. 2 shows in-line transmission of two products of the present invention as a function of wavelength of light ranging from the visible through the near-infrared and the infrared regions.
Figure 3:
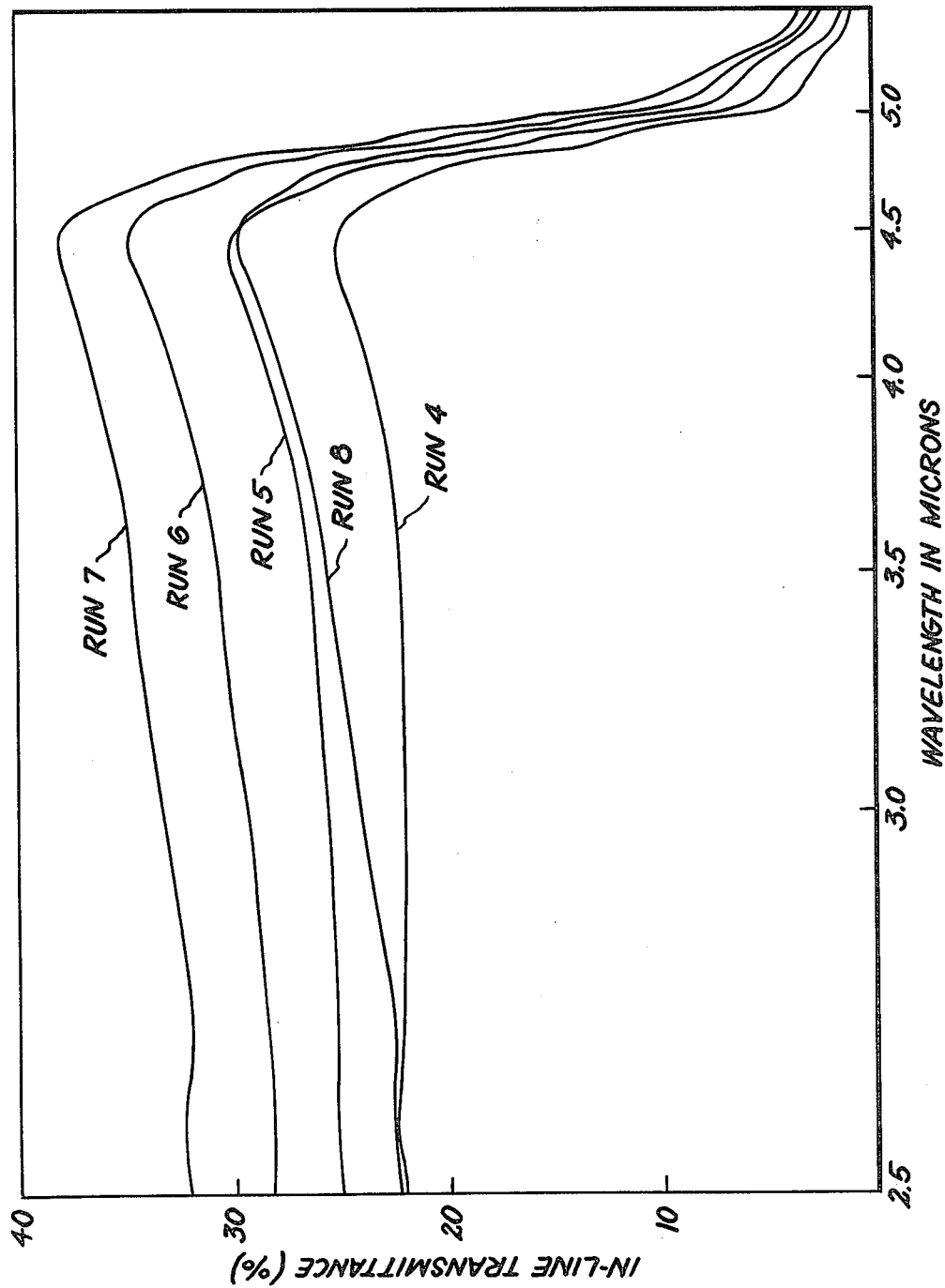
FIG. 3 shows in-line transmission as a function of the wavelengths of light in the infrared region for five products of the present invention which differed in oxygen content.

In-line transmission as a function of wavelength of each of the finally polished discs of Runs 1 to 10 was determined and the resulting curves for Runs 1 to 9 are shown in FIGS. 1, 2 and 3.

TABLE I

| Run | Oxygen Content (wt %) | BeSiN₂ (wt %) | Density (%) | Thickness of Disc (mm) |
|---|---|---|---|---|
| 1 | 3.2 | 9(1.3% Be) | >99.6 | 0.20 |
| 2 | " | 7(1% Be) | " | " |
| 3 | " | 5(.71% Be) | " | " |
| 4 | 3.1 (5 min.oxid.) | 7(1% Be) | " | 0.18 |
| 5 | 3.25 (10 min.oxide) | " | " | " |
| 6 | 3.4 (15 min.oxid.) | " | " | " |
| 7 | 3.7 (25 min.oxid.) | " | " | " |
| 8 | 4.0 (40 min.oxid.) | " | " | " |
| 9 | 3.25 (10 min.oxid.) | " | " | 0.15 |
| 10 | 3.2 | 5(.71% Be) | >99.7 | 0.30 |

Runs 3-10 illustrate the light-transmitting products of the present invention. The polished discs of Runs 3-9 were optically translucent.

FIG. 1 shows in-line transmission curves as a function of wavelength for the finally polished discs of Runs 1, 2 and 3. Specifically, FIG. 1 shows that as the densification agent decreased, i.e. with decreasing content of beryllium, the percent in-line transmission of the present light-transmitting product increased over the entire given wavelength of light. FIG. 1 also shows that exceptionally good light transmission occurs in the infrared wavelength range from about 3 microns to about 4.5 microns. Specifically, the curve for Run 3 shows an in-line transmission of about 11% at about 2.5 microns and an in-line transmission of about 26% at 4.5 microns. The in-line transmissions for Runs 1 and 2 were very low at wavelengths of about 2.5 microns due to less than optimum mixing of the silicon nitride powder with the BeSiN$_2$ additive. A comparison of the curves of Runs 1 and 2 of FIG. 1 with the Run 5 curve of FIG. 3, where the oxygen and BeSiN$_2$ contents were about the same, but where a substantially more uniform mixture was produced, shows the substantially better in-line transmission producible at a wavelength of about 2.5 microns and the importance of good mixing, particularly at higher levels of densification additive.

In FIG. 2, the complete in-line transmission from the visible region to the infrared region for the discs of Runs 3 and 9 is given. FIG. 2 shows that light transmittance occurs in detectable amounts of light near the end of the visible region and starts to increase and continues to increase in the near infrared region. Specifically, in FIG. 2, Run 3 shows an in-line transmission of about 25% at about 4.3 microns. Run 9 shows that light transmittance is detectable at wavelengths as low as 0.7 micron in the visible region and then increases to about 10% at 1.1 microns, to about 30% at 2 microns, and to about 37% at about 4.3 microns.

Figure 4:
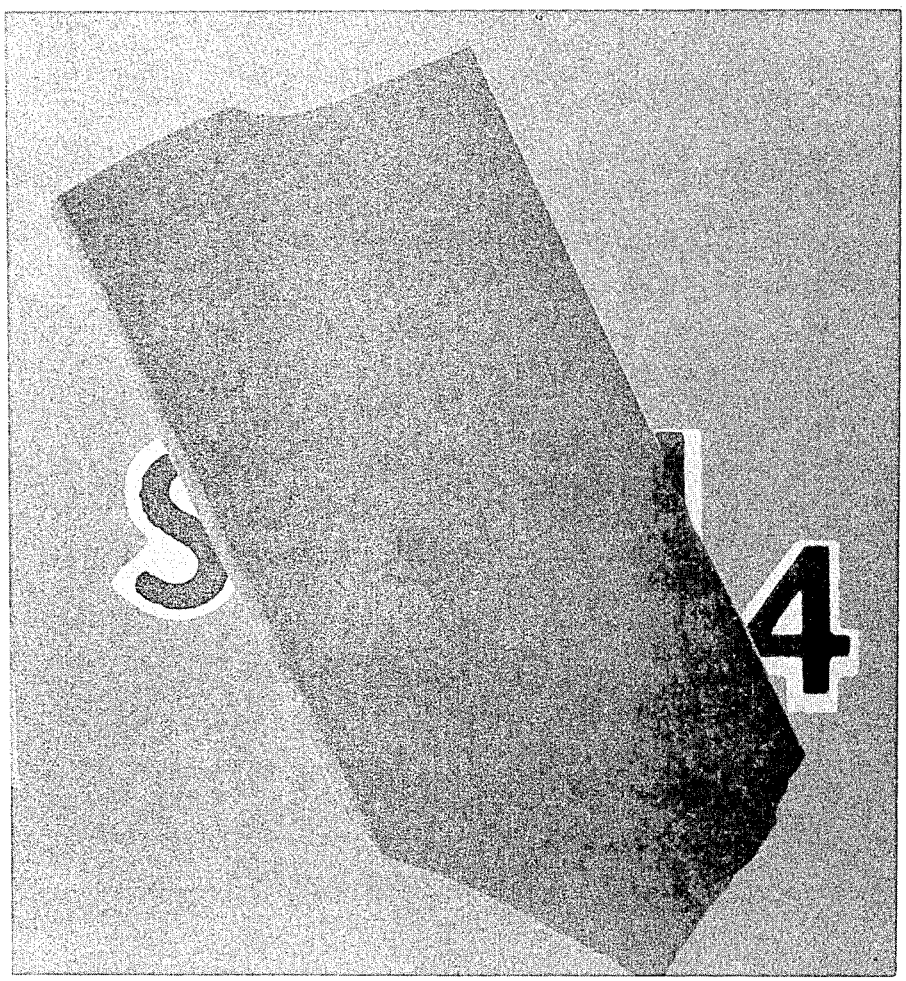
FIG. 4 is a photograph (magnified 7×) illustrating the translucency of a product of the present invention.

FIG. 4 illustrates the optical translucency of the disc of Run 9.

In FIG. 3 the discs of Runs 4–8 differed in oxygen content. FIG. 3 shows that as the oxygen content was increased from 3.1 weight % in Run 4 to 3.7 weight % in Run 7, there was a significant increase in in-line transmission, but as the oxygen content was further increased to 4% in Run 8, the in-line transmission dropped. Specifically, FIG. 3 shows an in-line transmission greater than 20% for Runs 4 to 8 at wavelengths ranging from about 2.5 microns to about 4.7 microns.

In Run 10, the disc was not optically translucent but exhibited an in-line transmission at a wavelength of about 2.4 microns of 7% and an in-line transmission at a wavelength of 4.5 microns of 13.4%.

U.S. Pat. No. 4,122,140 and U.S. Pat. No. 4,124,403, which is a division of U.S. Pat. No. 4,122,140, to Greskovich et al., both entitled "Hot Pressing of Silicon Nitride Using Beryllium Additive", the disclosure of which is incorporated herein by reference, disclose a dense polycrystalline silicon nitride body produced by hot pressing a particulate mixture of silicon nitride and a beryllium additive.

We claim:

1. A light transmitting polycrystalline silicon nitride body having a density of at least 99.5% of the theoretical density of silicon nitride and consisting essentially of silicon nitride, beryllium and oxygen, said silicon nitride ranging from the $\beta$-form to a mixture of the $\alpha$- and $\beta$-forms wherein the $\beta$-form is present in excess of 50% by weight of the total amount of said silicon nitride, said beryllium being present in an amount ranging from about 0.3% by weight to about 2.0 by weight of said body, said oxygen being present in an amount ranging from about 2.5% up to about 5% by weight of said body, said polycrystalline body ranging from a single phase body to one consisting of a primary phase and up to about 3% by volume of said body of secondary phase, said body having a thickness ranging from about 0.15 millimeter up to but less than about 0.4 millimeter, a minimum in-line transmission of about 5% of radiant energy at wavelengths ranging from about 0.9 micron to about 2.5 microns, and a minimum in-line transmission of about 10% at wavelengths ranging from about 2.5 microns to about 4.5 microns.

2. A light-transmitting polycrystalline silicon nitride body according to claim 1 in the form of a plate.

3. A light-transmitting polycrystalline silicon nitride body according to claim 1 wherein said thickness ranges from about 0.15 mm to about 0.2 millimeter which is optically translucent in the visible region.

* * * * *